United States Patent
Miyatani

(10) Patent No.: US 8,779,979 B2
(45) Date of Patent: Jul. 15, 2014

(54) MULTI-ANTENNA SIGNAL RECEIVING DEVICE PROCESSING MULTI-PATH INTERFERENCE

(75) Inventor: Tetsuhiko Miyatani, Yokohama (JP)

(73) Assignee: Samsung Electronics Co., Ltd., Suwon-si (KR)

(*) Notice: Subject to any disclaimer, the term of this patent is extended or adjusted under 35 U.S.C. 154(b) by 633 days.

(21) Appl. No.: 12/617,099

(22) Filed: Nov. 12, 2009

(65) Prior Publication Data

US 2010/0117904 A1 May 13, 2010

(30) Foreign Application Priority Data

Nov. 13, 2008 (JP) .................................. 2008-290792
May 4, 2009 (KR) ...................... 10-2009-0038886

(51) Int. Cl.
  *G01S 3/28* (2006.01)
  *H01Q 3/26* (2006.01)
  *H01Q 3/00* (2006.01)
  *H01Q 3/40* (2006.01)
  *H04B 1/7115* (2011.01)
  *H04B 1/7117* (2011.01)

(52) U.S. Cl.
  CPC .............. *H01Q 3/2605* (2013.01); *H01Q 3/26* (2013.01); *H01Q 3/40* (2013.01); *H04B 1/7115* (2013.01); *H04B 1/7117* (2013.01)
  USPC ..................... 342/383; 342/373; 375/E1.032

(58) Field of Classification Search
  CPC ......... H01Q 3/40; H01Q 3/26; H01Q 3/2605; H04B 1/7115; H04B 7/7117
  USPC .............................. 342/373, 383; 375/E1.032
  See application file for complete search history.

(56) References Cited

U.S. PATENT DOCUMENTS

| | | | | |
|---|---|---|---|---|
| 2,982,853 A * | 5/1961 | Price et al. | ..................... | 375/231 |
| 5,422,908 A * | 6/1995 | Schilling | ....................... | 375/130 |
| 6,563,860 B2 * | 5/2003 | Schilling | ....................... | 375/148 |
| 6,989,789 B2 * | 1/2006 | Ferreol et al. | .................. | 342/440 |
| 7,099,678 B2 * | 8/2006 | Vaidyanathan | ............... | 455/500 |
| 7,248,841 B2 * | 7/2007 | Agee et al. | ..................... | 455/101 |
| 2008/0316099 A1 * | 12/2008 | Fujii | ............................ | 342/373 |
| 2009/0066577 A1 * | 3/2009 | Kim et al. | ..................... | 342/373 |
| 2009/0079635 A1 * | 3/2009 | Xin | ................................ | 342/432 |

OTHER PUBLICATIONS

Bottomley, Gregory E., et al., "Adaptive Arrays and MLSE Equalization," Proceedings of the IEEE 45th Vehicular Technology Conference, Jul. 25-28, 1995, pp. 50-54, vol. 1.

* cited by examiner

*Primary Examiner* — Frank J McGue
(74) *Attorney, Agent, or Firm* — NSIP Law

(57) ABSTRACT

Described herein is a multi-antenna signal receiving device that includes a plurality of reception antennas that is capable of maximizing a diversity gain while eliminating a multi-path interference (MPI). The device receives a first received signal of a first antenna that includes components corresponding to a plurality of first paths and the device receives a second received signal of a second antenna that includes components corresponding to a plurality of second paths. The multi-antenna signal receiving device detects a component corresponding to a first path among the plurality of first paths, and a component corresponding to a second path among the plurality of second paths.

15 Claims, 11 Drawing Sheets

FIG. 10
TRANSMISSION ANTENNA 1
$r1 = (a1, b1, c1, d1)$
TRANSMISSION ANTENNA 2
$r2 = (a2, b2, c2, d2)$
TRANSMISSION ANTENNA 3
$r3 = (a3, b3, c3, d3)$
TRANSMISSION ANTENNA 4
$r4 = (a4, b4, c4, d4)$
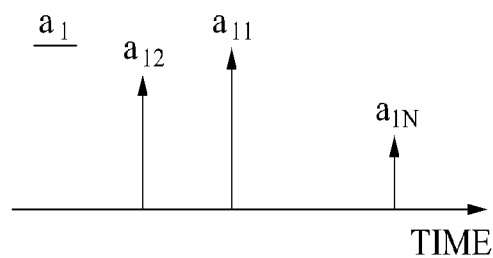
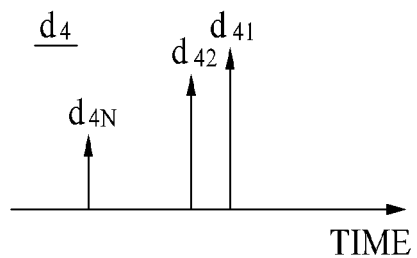

MULTI-ANTENNA SIGNAL RECEIVING DEVICE PROCESSING MULTI-PATH INTERFERENCE

CROSS-REFERENCE TO RELATED APPLICATIONS

This application claims the benefit under 35 U.S.C. §119 (a) of a Japanese Patent Application No. 2008-290792 filed on Nov. 13, 2008 in the Japanese Patent Office and a Korean Patent Application No. 10-2009-0038886 filed on May 4, 2009 in the Korean Intellectual Property Office, the entire disclosures of which are incorporated herein by reference for all purposes.

BACKGROUND

1. Field

The following description relates to a receiving device including a plurality of reception antennas, and more particularly, to a technology that may maximize a diversity gain, while reducing or eliminating a multi-path interference (MPI).

2. Description of Related Art

Researches have been conducted to provide various multimedia services that support a high quality and a high data transmission rate, in a wireless communication environment. As part of the research, a technology related to a multi-input multi-out (MIMO) system that uses a plurality of channels in a spatial area has been developed.

The MIMO technology uses multiple antennas to increase a number of channel bits in a limited frequency resource, and provides a high data transmission rate. The MIMO technology uses multiple transmission/reception antennas in an environment where one or more scatterers exist, to provide a channel capacity proportional to a smaller number of antennas, between the transmission antennas and the reception antennas.

In the MIMO communication system, a plurality of channels exist between a transmitting device and a receiving device. As an example, when a number of antennas of the transmitting device and a number of antennas of the receiving device are four, a received signal Y may be expressed as given in the exemplary Equation 1 below.

$$Y = \begin{bmatrix} y_1 \\ y_2 \\ y_3 \\ y_4 \end{bmatrix}$$

$$= \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix} \begin{bmatrix} x_1 \\ x_2 \\ x_3 \\ x_4 \end{bmatrix} + \begin{bmatrix} n_1 \\ n_2 \\ n_3 \\ n_4 \end{bmatrix}$$

$$= HX + N$$

[Equation 1]

In this example, the symbols $x_1$, $x_2$, $x_3$, and $x_4$ are transmission symbols, $h_{ab}$ is a channel coefficient corresponding to a path until a $b^{th}$ transmission symbol reaches an $a^{th}$ receiving antenna, and $n_1$, $n_2$, $n_3$, and $n_4$ are noise.

The receiving device separates a received signal into a plurality of streams and performs detection. The streams, for example, the transmission symbols, transmitted from the transmitting device are difficult to accurately detect when multi-path interference (MPI) exists.

SUMMARY

In one general aspect, provided is a multi-antenna signal receiving device, comprising at least two antennas to receive at least one stream, a received signal of a first antenna including components corresponding to a plurality of first paths and a received signal of a second antenna including components corresponding to a plurality of second paths, a first detector to detect a component corresponding to a first path of the plurality of first paths from among components included in the received signal of the first antenna, and to detect a component corresponding to a second path of the plurality of second paths from among components included in the received signal of the second antenna, a second detector to detect a component corresponding to the remaining first paths of the plurality of first paths from among the components included in the received signal of the first antenna, and to detect a component corresponding to the remaining second paths of the plurality of second paths from among the components included in the received signal of the second antenna, and a combining unit to combine the detected component from the first detector and the detected component from the second detector, to detect the at least one stream.

The device may further comprise a QR decomposition unit to perform QR decomposition with respect to a channel matrix based on the received at least one stream, to calculate a Q matrix and an R matrix.

The first detector may remove a multi-path interference existing in the received signal using at least one stream detected from a prior iteration, extract the component corresponding to the first path from among the components included in the received signal of the first antenna, and detect the at least one stream using the Q matrix and the R matrix.

The first detector may comprise a first multi-path interference eliminating unit to remove a multi-path interference existing in the received signal of the first antenna using at least one stream detected from a prior iteration, and to extract the component corresponding to the first path from among the components included in the received signal of the first antenna.

The first path may have a higher gain than the remaining first paths of the plurality of first paths.

The first detector may further comprise a first Q matrix transformer to transform the component corresponding to the first path of the plurality of first paths using the Q matrix.

The first detector may further comprise a plurality of first frequency domain equalizers (FDEs) to perform equalization of an output of the first Q matrix transformer in a frequency domain prior to performing Inverse Fourier Transform.

The first detector may further comprise a plurality of first Inverse Discrete Fourier Transformers (IDFTs) to perform Inverse Discrete Fourier Transform with respect to outputs of the plurality of the first FDEs.

The first detector may further remove a multi-path interference existing in the received signal of the second antenna using at least one stream detected from a prior iteration, extract the component corresponding to the second path from among the components included in the received signal of the second antenna, and detect the at least one stream using the Q matrix and the R matrix.

The first multi-path interference eliminating unit further removes a multi-path interference existing in the received signal of the second antenna using at least one stream detected from a prior iteration, and extracts the component corresponding to the second path from among the components included in the received signal of the second antenna.

The second detector may comprise a second multi-path interference eliminating unit to remove a multi-path interference existing in the received signal of the first antenna using at least one stream detected from a prior iteration, and to extract the component corresponding to the remaining first paths from among the components included in the received signal of the first antenna.

The second multi-path interference eliminating unit may further remove a multi-path interference existing in the received signal of the second antenna using at least one stream detected from a prior iteration, and extract the component corresponding to the remaining second paths from among the components included in the received signal of the second antenna.

The second detector may further comprise a second Q matrix transformer to transform the component corresponding to the remaining first paths and the component corresponding to the remaining second paths using the Q matrix.

The second detector may further comprise a plurality of second FDEs to perform equalization of an output of the second Q matrix transformer in a frequency domain prior to performing Discrete Inverse Fourier Transform.

The second detector may further comprise a plurality of second IDFTs to perform Inverse Discrete Fourier Transform with respect to outputs of the plurality of second FDEs.

Other features and aspects will be apparent from the following detailed description, the drawings, and the claims.

BRIEF DESCRIPTION OF THE DRAWINGS

FIG. 10 is a diagram illustrating a received signal of four reception antennas, when four transmission antennas and the four reception antennas are provided.

Figure 1:
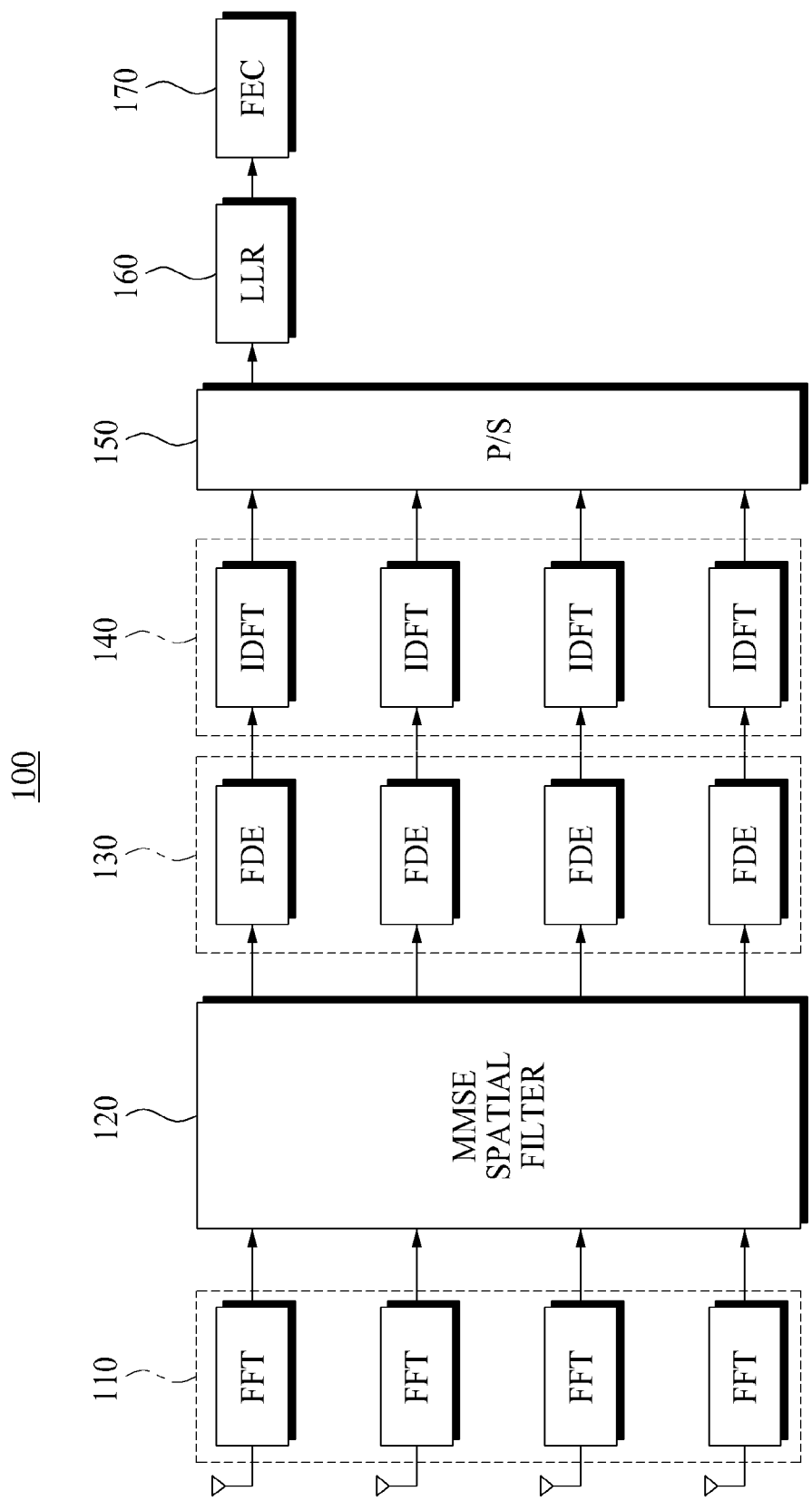
FIG. 1 illustrates an example of a two dimensional minimum mean square error (MMSE) based multi-antenna signal receiving device.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an example of a two dimensional (2D)-minimum mean square error (MMSE) based multi-antenna signal receiving device.

Referring to FIG. 1, a multi-antenna signal receiving device 100 may include four receiving antennas, four fast Fourier transforms (FFTs) 110 corresponding to the receiving antennas, the MMSE spatial filter 120, four frequency domain equalizers (FDEs) 130, four inverse discrete Fourier transforms (IDFTs) 140, a parallel-to-serial (P/S) converter 150, a log-likelihood ratio (LLR) detector 160, and a forward error correction (FEC) 170.

In this example, it is assumed that a transmitting end transmitted transmission symbols $x_1$, $x_2$, $x_3$, and $x_4$ via a channel H, as illustrated in Equation 1. The four receiving antennas of the multiple antenna receiver 100 receive four received symbols $y_1$, $y_2$, $y_3$, and $y_4$ as also shown in Equation 1.

The FFTs 110 may transform the received symbols $y_1$, $y_2$, $y_3$, and $y_4$ from time domain signals to frequency domain signals. The MMSE spatial filter 120 may filter the received symbols $y_1$, $y_2$, $y_3$, and $y_4$ based on a coefficient disclosed in the following Equation 2:

$$\frac{H^H}{H^H H + \frac{N}{S}} \qquad \text{[Equation 2]}$$

where S is the power of transmission symbols, and $X^H$ denotes Hermitian Transpose of X.

If a noise term is ignored, the coefficient disclosed in Equation 2 may be represented as, $$H^H/(H^H H). \qquad \text{[Equation 3]}$$

The MMSE spatial filter 120 may perform an inner product operation for a vector consisting of the received symbols and the coefficient disclosed in Equation 3, as illustrated by, $$\frac{H^H}{H^H H} Y = \frac{H^H}{H^H H} HX + \frac{H^H}{H^H H} N \qquad \text{[Equation 4]}$$
$$= X + \frac{H^H}{H^H H} N.$$

From Equation 4, it can be known that the received symbols are separated for each substream.

The FDEs 130 may perform frequency domain equalization for an output of the MMSE spatial filter 120. By performing the frequency domain equalization, it is possible to compensate for distortion created by multi-path interference.

The IDFTs 140 may transform outputs of the FDEs 130 from frequency domain signals back to time domain signals. An output of the IDFTs 140 may be multiplexed via the P/S converter 150.

The LLR detector 160 may detect a log-likelihood ratio (LLR) of an output of the P/S converter 150. The FEC 170 may perform error correction based on the detected LLR.

The multi-antenna signal receiving device 100 of FIG. 1 may use a two-dimensional MMSE scheme that processes a received signal based on an MMSE criterion, with respect to a frequency and a space, and may struggle to obtain a diversity gain corresponding to a number of the reception antennas. For example, the multi-antenna signal receiving device 100 of FIG. 1 may compensate for the distortion when the multi-path interference is low. However, when the amount of multi-path interference is high, the multi-antenna signal receiving device 100 of FIG. 1 may struggle to compensate for the distortion created by the multi-path interference.

Figure 2:
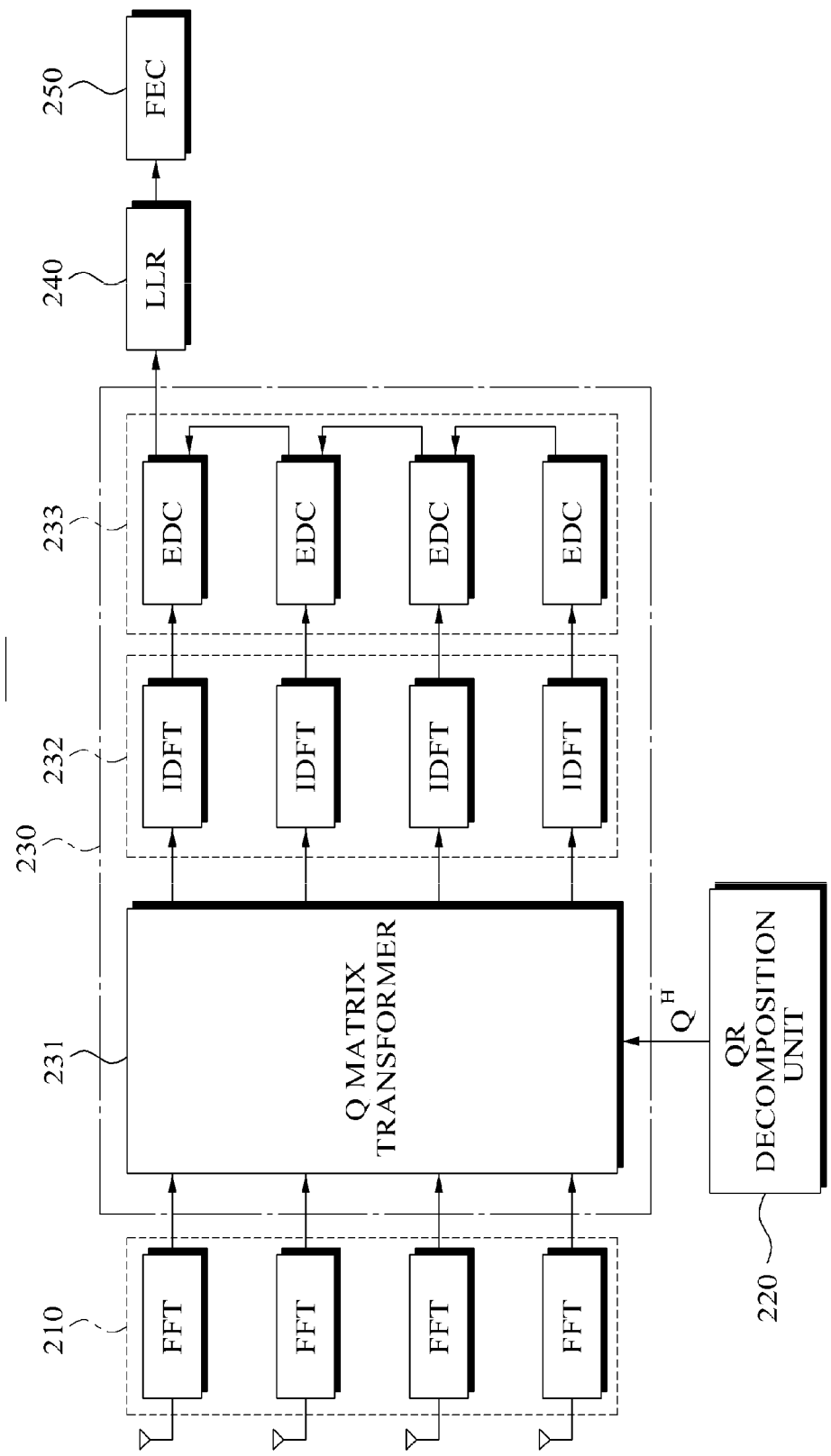
FIG. 2 illustrates an example of a QR decomposition-maximum likelihood direction (QRD-MLD) multi-antenna signal receiving device.

FIG. 2 illustrates an example of a QR decomposition-maximum likelihood direction (QRD-MLD) multi-antenna signal receiving device.

Referring to FIG. 2, the QR decomposition-based QRD-MLD multi-antenna signal receiving device 200 may include four reception antennas, four FFTs 210 corresponding to the four reception antennas, a QR decomposition unit 220, a QRD-MLD block 230, an LLR detector 240, and a FEC 250. Also, the QRD-MLD block 230 may include a Q matrix transformer 231, four inverse discrete Fourier transformers (IDFTs) 232, and four Euclidean distance calculators (EDCs) 233.

The amount of antennas included in the device is not limited to four. As will be appreciated, one or more antennas, FFTs 210, IDFTs 232, and/or EDCs 233 may be used.

The FFTs 210 transform a received signal of each of the reception antennas from a time domain signal into a signal of a frequency domain. The QR decomposition unit 220 performs QR decomposition of a channel matrix H based on the received signals, to calculate a Q matrix and an R matrix.

The Q matrix transformer 231 performs an inner-product of Y and $Q^H$ which are comprised of the received signals, as illustrated below in Equation 5.

$$Q^H Y = Q^H HX + Q^H N \quad \text{[Equation 5]}$$
$$= Q^H QRX + Q^H N$$
$$= RX + Q^H N$$

In this instance, $Q^H Y$ may be expressed as given in Equation 6 below.

$$Q^H Y = \begin{bmatrix} R_{00} & R_{01} & R_{02} & R_{03} \\ 0 & R_{11} & R_{12} & R_{13} \\ 0 & 0 & R_{22} & R_{23} \\ 0 & 0 & 0 & R_{33} \end{bmatrix} \begin{bmatrix} X_0 \\ X_1 \\ X_2 \\ X_3 \end{bmatrix} + Q^H \begin{bmatrix} n_0 \\ n_1 \\ n_2 \\ n_3 \end{bmatrix} \quad \text{[Equation 6]}$$

Referring to Equation 6, the multi-antenna signal receiving device 200 is capable of sequentially detecting $X_3$, $X_2$, $X_1$, and $X_0$, because the multi-antenna signal receiving device 200 knows the R matrix and the Q matrix.

Figure 5:
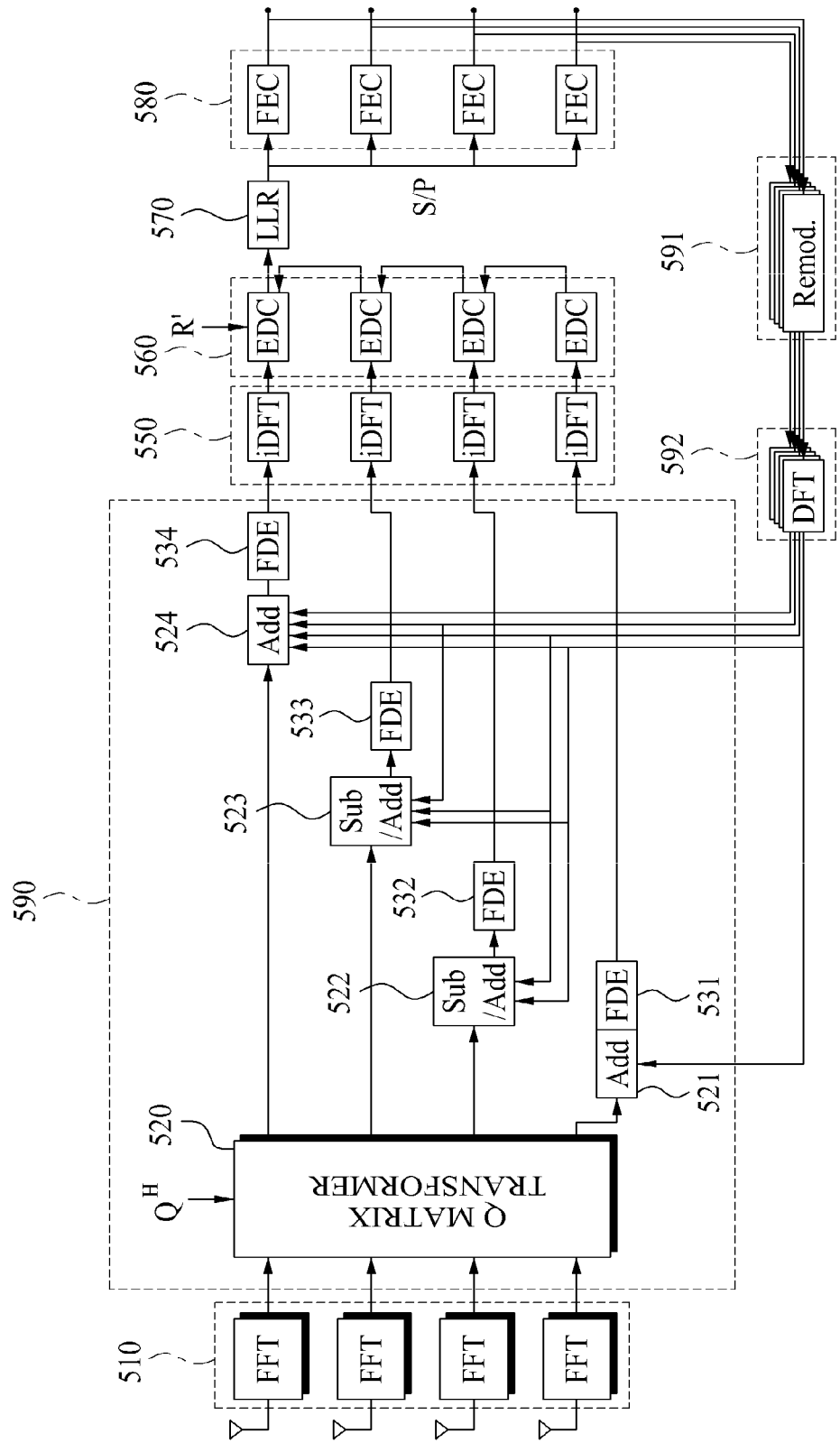
FIG. 5 illustrates a second example of a QRDE-MLD multi-antenna signal receiving device.
Figure 6:
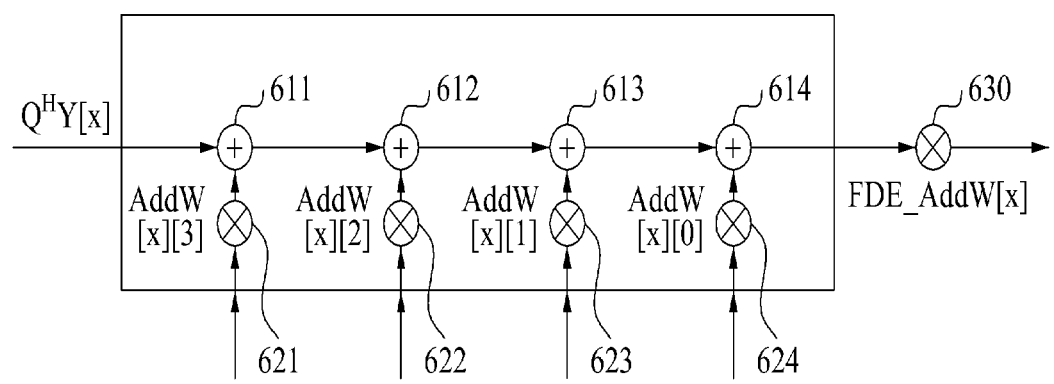
FIG. 6 illustrates an exemplary addition unit and an exemplary frequency domain equalizer that may be incorporated into the QRDE-MLD multi-antenna signal receiving device of FIG. 5.

The IDFTs 232 transform an output of the Q matrix transformer 231 from a frequency domain signal into a signal of a time domain. Referring to FIGS. 5 and 6, because the R matrix is an upper-triangular matrix, $X_3$ through $X_0$ may be sequentially detected with a limited amount of calculations.

The EDCs 233 sequentially detect $X_3$ through $X_0$ using the R matrix. For example, a Euclidean distance calculator of a last stage, such as the Euclidean distance calculator of a fourth stage, detects $X_3$ using $R_{33}$, and transfers the detection result to a Euclidean distance calculator of a third stage. In the same manner, a detection result of the Euclidean distance calculator of the third stage is transferred to an Euclidean distance calculator of the second stage, and a detection result of the Euclidean distance calculator of the second stage is transferred to a Euclidean distance calculator of a first stage. Therefore, $X_3$ through $X_0$ are sequentially detected through the EDCs 233.

In this example, the EDCs 233 may detect transmission symbols using a Euclidean distance as given in Equation 7 below.

$$\underset{X_s}{\arg\text{MIN}} \|Q^H Y - RX_s\| \quad \text{[Equation 7]}$$

As illustrated in Equation 7, Xs is a possible transmission symbol which is a candidate transmission symbol. As an example, when a modulation scheme is 16-QAM, a number of candidate transmission symbols is sixteen.

The LLR detector 240 detects a log-likelihood ratio and the FEC 250 corrects an error based on the detected log-likelihood ratio.

The multi-antenna signal receiving device 200 of FIG. 2 may obtain a diversity gain corresponding to a number of reception antennas through QR decomposition, and may detect transmission symbols with a relatively small amount of calculations. However, the multi-antenna signal receiving device 200 of FIG. 2 may struggle to equalize a distortion caused by a multi-path interference because each of elements of a channel matrix has an independent multi-path interference.

Figure 3:
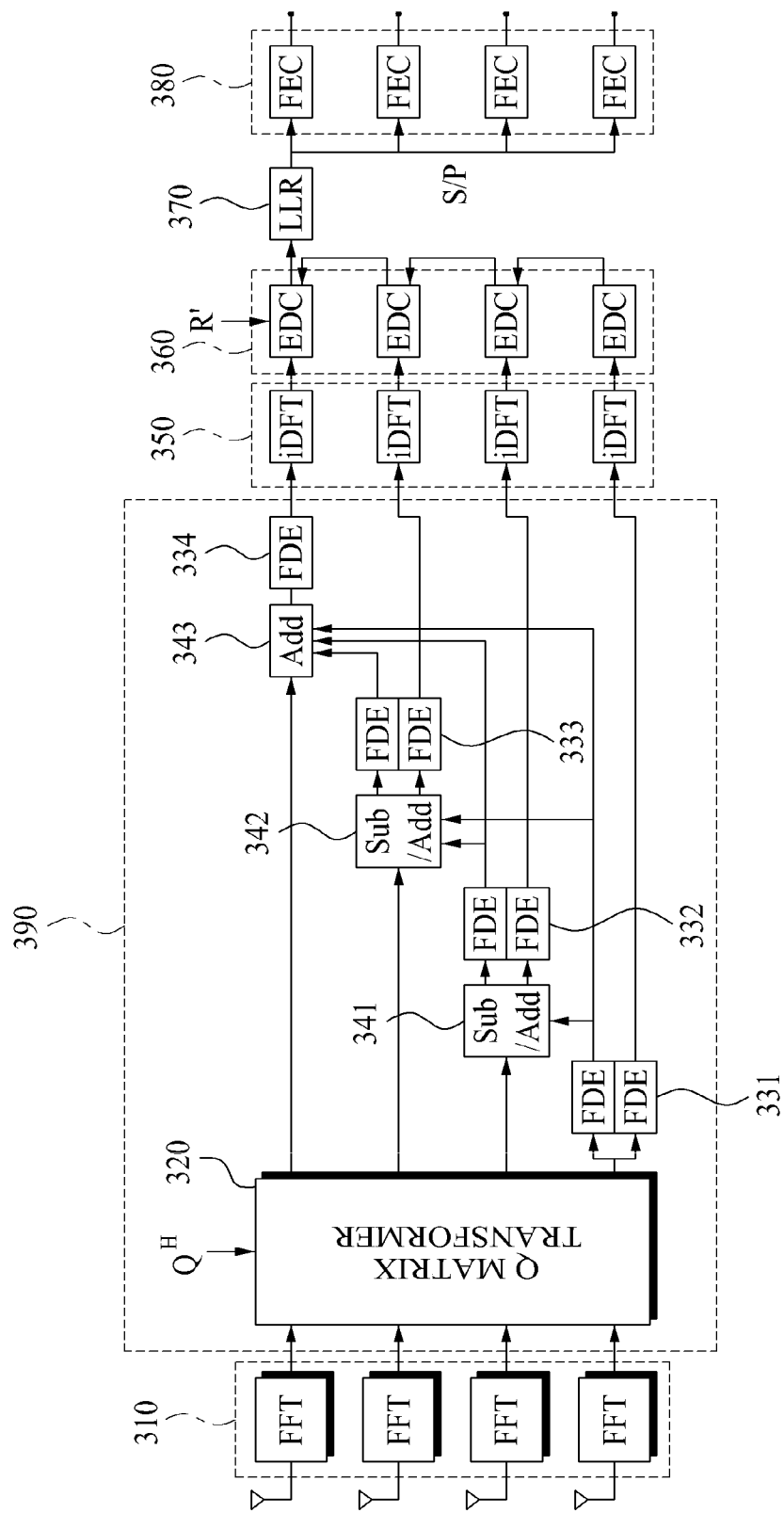
FIG. 3 illustrates an example of a QRD engine-MLD (QRDE-MLD) multi-antenna signal receiving device utilizing frequency domain equalization.

FIG. 3 illustrates an example of a QRDE-MLD multi-antenna signal receiving device utilizing frequency domain equalization.

Referring to FIG. 3, the QRDE-MLD multi-antenna signal receiving device may include four reception antennas, four FFTs 310, a QRDE-MLD block 390, four IDFTs 350, four EDCs 360, an LLR detector 370, and four FECs 380. In this example, the QRDE-MLD block 390 includes a Q matrix transformer 320, subtraction/addition units 341 and 342, an addition unit 343, FDEs 331, 332, 333, and 334, and IDFTs 350.

The FFTs 310 may transform a received signal of each of the four reception antennas from a time domain signal into a signal of a frequency domain.

The Q matrix transformer 320 may perform an inner-product on the received signals and the Q matrix as illustrated in Equation 6 below. An output of a fourth stage of the Q matrix transformer 320 may be inputted to two FDEs 331. The two FDEs 331 equalize the output of the fourth stage of the Q matrix transformer 320. The two FDEs 331 may provide one of two outputs of the two FDEs 331 to the IDFTs and may provide a remaining output to subtraction/addition units 341 and 342 and an addition unit 343 existing in a first stage, a second, and a third stage, respectively.

In this example, an IDFT of a fourth stage and a Euclidean distance calculator (EDC) of the fourth stage detect $X_4$ using a Euclidean distance, based on an R' matrix. The R' matrix is a modulated R matrix, and will be further described below.

The Euclidean distance calculator of the fourth stage provides the detected $X_4$ to a Euclidean distance calculator of a third stage. In this example, the Euclidean distance calculator of the third stage detects $X_3$ using the detected $X_4$.

The subtraction/addition unit 341 receives an output of one of the two FDEs existing in the fourth stage.

In this example, the subtraction unit included in the subtraction/addition unit 341 removes a component corresponding to the fourth stage of the Q matrix transformer 320 from an output of the third stage of the Q matrix transformer 320. For example, the subtraction unit included in the subtraction/addition unit 341 multiplies the output of the FDE of the fourth stage by a predetermined subtraction coefficient, and subtracts the multiplication result from the output of the third stage of the Q matrix transformer 320.

The addition unit included in the subtraction/addition unit 341 adds a predetermined signal component to the output of the third stage of the Q matrix transformer 320 to enable the output of the third stage of the Q matrix transformer 320 and the output of the fourth stage of the Q matrix transformer 320 to have a same variation in the frequency domain. For example, the addition unit included in the subtraction/addition 341 multiplies the output of the fourth stage of the Q matrix transformer 320 by a predetermined addition coefficient, and adds the multiplication result to the output of the third stage of the Q matrix transformer 320.

Two outputs of the subtraction/addition unit 341 are provided to two FDEs 332. The two FDEs 332 perform equalization in the frequency domain. The two FDEs 332 generate two outputs, one of the outputs is provided to a subtraction/addition unit 342, and the remaining output is provided to the Euclidean distance calculator of the third stage after being inputted to an IDFT of the third stage.

The subtraction/addition unit 342 receives one of the two outputs from the two FDEs 331 and 332. The subtraction unit included in the subtraction/addition unit 342 removes a component corresponding to the output of the fourth stage of the Q matrix transformer 320 and a component corresponding to the output of the third stage of the Q matrix transformer 320 from an output of an FDE of a second stage by using a predetermined subtraction coefficient.

In this example, the addition unit included in the subtraction/addition unit 342 adds a predetermined signal component to an output of a second stage of the Q matrix 320 to enable the output of the fourth stage of the Q matrix 320, the output of the third stage of the Q matrix 320, and the output of the second stage of the Q matrix 320, to have a same variation in the frequency domain.

Also, the two FDEs 333 equalize two outputs of the subtraction/addition unit 342 in the frequency domain. One of the two outputs of the two FDEs 333 is detected through a Euclidean distance calculator of a second stage after being inputted to an IDFT of a second stage. The remaining output of the two FDEs 333 is provided to the addition unit 343.

The addition unit 343 receives an output of a first stage of the Q matrix transformer 320 and also receives one of the two outputs of the two FDEs 331, 332, and 333. The addition unit 343 adds a predetermined signal component to the output of the first stage of the Q matrix transformer 320 to enable the output of the fourth stage of the Q matrix transformer 320, the output of the third stage of the Q matrix transformer 320, the output of the second stage of the Q matrix transformer 320, and the output of the first stage of the Q matrix transformer 320, to have a same variation in the frequency domain. Here, the subtraction is not essentially required.

An output of the addition unit 343 may be equalized through the FDE 334 in the frequency domain and may be detected through the IDFT and the Euclidean distance calculator.

The LLR detector 370 may detect a log-likelihood ratio and provide the detected log-likelihood ratio to a plurality of FECs 380. In this example, the plurality of FECs 380 perform error correction. A multiple user MIMO communication system may use a plurality of FECs 380 A single user MIMO communication system may use a single FEC.

Figure 4:
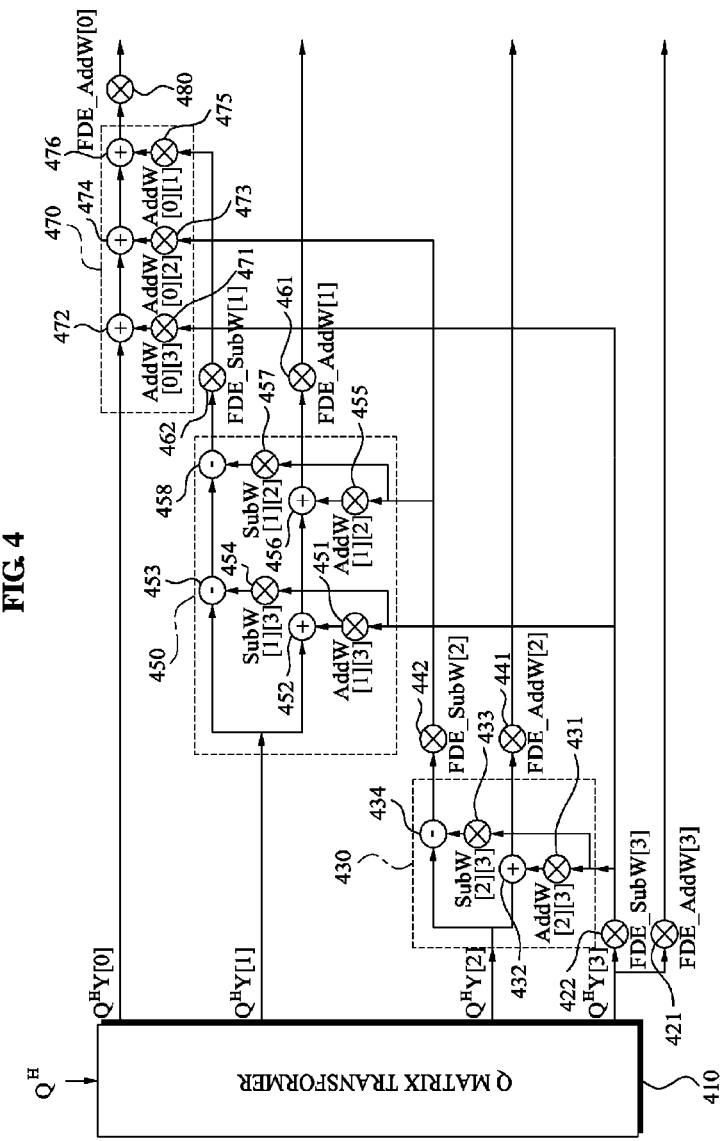
FIG. 4 illustrates an operation of exemplary subtraction/addition units, an exemplary addition unit, and exemplary frequency domain equalizers that may be incorporated into the QRDE-MLD multi-antenna receiving device of FIG. 3.

FIG. 4 illustrates an operation of an exemplary subtraction/addition units 341 and 342, exemplary addition unit 343, and exemplary FDEs 331, 332, 333, and 334 that may be incorporated into the QRDE-MLD multi-antenna receiving device of FIG. 3.

Referring to FIG. 4, a Q matrix transformer 410 outputs $Q^H Y[3]$, $Q^H Y[2]$, $Q^H Y[1]$, and $Q^H Y[0]$ for each stage. In this example, $Y[x]$ is an $x^{th}$ element of a Y vector.

The two FDEs 331 perform equalization of the $Q^H Y[3]$ using equalization coefficients FDE_AddW[3] and FDE_SubW[3]. In this example, an upper FDE of the two FDEs 331 corresponds to a multiplication unit 422, and a lower FDE corresponds to a multiplication unit 421.

The multiplication unit 421 performs an inner-product of the FDE_AddW[3] with the $Q^H Y[3]$, and the multiplication unit 422 performs an inner-product of the FDE_SubW[3] with the $Q^H Y[3]$. The FDE_AddW[3] and the FDE_SubW[3] may be expressed as illustrated below in Equation 8.

$$\frac{R_{33}^H}{R_{33}^H R_{33} + \frac{N}{S}} \qquad \text{[Equation 8]}$$

An output of the multiplication unit 422 is provided to a subtraction/addition unit 430 of a third stage.

A multiplication unit 431 performs an inner-product of the output of the multiplication unit 422 with an addition coefficient AddW[2][3]. Also, an addition unit 432 adds an output of the multiplication unit 431 and the $Q^H Y[2]$. In this example, the output of the multiplication unit 431 is added to the $Q^H Y[2]$ to enable the $Q^H Y[3]$ and the $Q^H Y[2]$ to have a same variation in the frequency domain.

For example, the AddW[2][3] may be expressed as illustrated below in Equation 9.

$$AddW_{[2][3]}(\omega) = \left( \frac{\overline{R_{23}}}{\overline{R_{22}}} R_{22} - R_{23} \right). \qquad \text{[Equation 9]}$$

In this example, $\overline{R_{xy}}$ is a mean vector of a y sub-stream in a stage x.

The output of the multiplication unit 422 is provided to a multiplication unit 433. The multiplication unit 433 performs an inner-product of a subtraction coefficient SubW[2][3] and the output of the multiplication unit 422. Also, an output of the multiplication unit 433 is provided to a subtraction unit 434. A subtraction unit 434 subtracts the output of the multiplication unit 433 from the $Q^H Y[2]$. Accordingly, a component corresponding to the $Q^H Y[3]$ may be removed from the $Q^H Y[2]$. The SubW[2][3] may be expressed as illustrated below in Equation 10.

$$SubW_{[2][3]}(\omega) = R_{23} \qquad \text{[Equation 10]}$$

An output of the addition unit 432 may be expressed as illustrated below in Equation 11.

$$\{Q^H Y\}[2] + AddW[2][3]FDE\_Sub[3]\{Q^H Y\}[3] = \quad \text{[Equation 11]}$$

$$R_{22}X_2 + R_{23}X_3 + n_2 +$$

$$\left(\frac{\overline{R_{23}}}{\overline{R_{22}}}R_{22} - R_{23}\right)\frac{R_{33}^H}{R_{33}^H R_{33} + \frac{N}{S}}(R_{33}X_3 + n_3) =$$

$$R_{22}X_2 + R_{23}X_3 + n_2 + \left(\frac{\overline{R_{23}}}{\overline{R_{22}}}R_{22} - R_{23}\right)X_3 \because highSNR =$$

$$R_{22}X_2 + \frac{\overline{R_{23}}}{\overline{R_{22}}}R_{22}X_3 + n_2 = R_{22}\left\{X_2 + \frac{\overline{R_{23}}}{\overline{R_{22}}}X_3\right\} + n_2$$

In Equation 11, for ease of description, $n_3$ or a noise of an equalization coefficient is regarded as '0'.

The multiplication unit 422 corresponding to an FDE of the third stage performs an inner-product of an equalization coefficient FDE_SubW[2] with an output of a subtraction unit 434. The equalization coefficient FDE_SubW[2] may be expressed as illustrated below in Equation 12.

$$FDE\_SubW[2] = \frac{R_{22}^H}{R_{22}^H R_{22} + \frac{N}{S}}, \quad \text{[Equation 12]}$$

A multiplication unit 441 performs an inner-product of the output of the addition unit 432 with the FDE_AddW[2]. The FDE_AddW[2] may be expressed as illustrated below in Equation 13.

$$FDE\_AddW[2] = \frac{R_{22}^H R_{2Sum}}{R_{22}^H R_{22} R_{2Sum} + \frac{N}{S}}, \quad \text{[Equaiton 13]}$$

$$R_{2Sum} = \frac{\sum_{m=2}^{3} |\overline{R_{2m}}|^2}{|\overline{R_{22}}|^2}$$

In this example, a size of N/S may be set as an appropriate value according to a communication environment.

A subtraction coefficient SubW[x][y], an addition coefficient AddW[x][y], an equalization coefficient FDE_SubW[x], and an equalization coefficient FDE_AddW[x], may be generalized as illustrated below in Equation 14. One or more of the subtraction coefficient, the addition coefficient, and the equalization coefficients may be used in each stage.

$$SubW_{[x][y]} = R_{xy} \quad \text{[Equation 14]}$$

$$AddW_{[x][y]} = \left(\frac{\overline{R_{xy}}}{\overline{R_{xx}}}R_{xx} - R_{xy}\right)$$

$$FDE\_SubW_{[x]} = \frac{R_{xx}^H}{R_{xx}^H R_{xx} + \frac{N}{S}}$$

$$FDE\_AddW_{[x]} = \frac{R_{xx}^H R_{xSum}}{R_{xx}^H R_{xx} R_{xSum} + \frac{N}{S}},$$

$$R_{xSum} = \frac{\sum_{m=x}^{N_{RX}-1} |\overline{R_{xm}}|^2}{|\overline{R_{xx}}|^2}$$

The R matrix may be required to be modulated as an R' matrix due to an existence of the subtraction unit or the addition unit.

The R' may be expressed as illustrated below in Equation 15.

$$R'_{xy} = (R_{xy} + R_{yy}W_{subY}AddW_{xy})W_{addx} \quad \text{[Equation 15]}$$

$$= \left\{\begin{array}{c} R_{xy} + \\ \left(\frac{\overline{R_{xy}}}{\overline{R_{xx}}}R_{xx} - R_{xy}\right)\frac{|R_{yy}|^2}{|R_{yy}|^2 + \frac{N}{S}} \end{array}\right\} \frac{R_{xx}^H R_{xSum}}{|R_{xx}|^2 R_{xSum} + \frac{N}{S}}$$

$$R_{xSum} = \frac{\sum_{m=x}^{N_{RX}-1} |\overline{R_{xm}}|^2}{|\overline{R_{xx}}|^2}$$

An exemplary procedure of processing streams of a third stage and a fourth stage has been described, and thus, a procedure of processing streams of a first stage and a second stage will be omitted.

The QRDE-MLD multi-antenna signal receiving device may perform, for each stage, equalization of a signal variation in the frequency domain by correcting a signal of a lower stage in a predetermined stage through an addition unit, to correct distortion caused by an MPI. The QRDE-MLD multi-antenna signal receiving device may detect a transmission symbol by eliminating a component corresponding to a signal of the lower stage from a signal of the predetermined stage.

However, the QRDE-MLD multi-antenna receiving device in a broadband application may not sufficiently compensate for the distortion caused by the MPI because QR decomposition generally increases a frequency selectivity.

FIG. 5 illustrates a second example of a QRDE-MLD multi-antenna signal receiving device.

Referring to FIG. 5, the QRDE-MLD multi-antenna signal receiving device may include, among other things, four reception antennas, four FFTs 510, and a Q matrix transformer 520.

A basic operation of the QRDE-MLD multi-antenna signal receiving device of FIG. 5 is the same as an operation of the QRDE-MLD multi-antenna signal receiving device of FIGS. 3 and 4. However, the QRDE-MLD multi-antenna signal receiving device of FIG. 5 re-inputs a signal to addition units 521 and 524 and subtraction/addition units 522 and 523, through a re-modification unit 591 and a DFT 592. The re-inputted signal undergoes a process of detection and error correction.

In this example, an addition coefficient used by the addition units 521 and 524 and the subtraction/addition unit 522 and 523 may be expressed as illustrated below in Equation 16.

$$AddW_{[x][y]} = \left(\frac{\overline{R_{xy}}}{\overline{R_{xx}}}R_{xx} - R_{xy}\right), \ y \neq x \quad \text{[Equation 16]}$$

FIG. 6 illustrates an exemplary addition unit and an exemplary frequency domain equalizer that may be incorporated into the QRDE-MLD multi-antenna signal receiving device of FIG. 5.

Referring to FIG. 6, the addition units 521 and 524 include a plurality of multiplication units 621, 622, 623, and 624. The addition units 521 and 524 also include a plurality of addition units 611, 612, 613, and 614.

The plurality of multiplication units 621, 622, 623, and 624 perform an inner-product of output signals of the DFT 592 with addition coefficients as illustrated above in Equation 16. The outputs of the multiplication units 621, 622, 623, and 624 are provided to the addition units 611, 612, 613, and 614.

The addition unit 611 performs an inner-product of an output of the multiplication unit 621 with $Q^H Y[X]$. Also, an output of the addition unit 611 is provided to a neighboring addition unit 612. The addition unit 612 adds the output of the addition unit 611 and an output of the multiplication unit 622. The addition unit 613 adds an output of the addition unit 612 and an output of the multiplication unit 623. The addition unit 614 also adds an output of the addition unit 613 and an output of the multiplication unit 624.

The multiplication unit 630 performs equalization of the output of the addition unit 614 using an equalization coefficient FDE_AddW[X] in the frequency domain.

Figure 7:
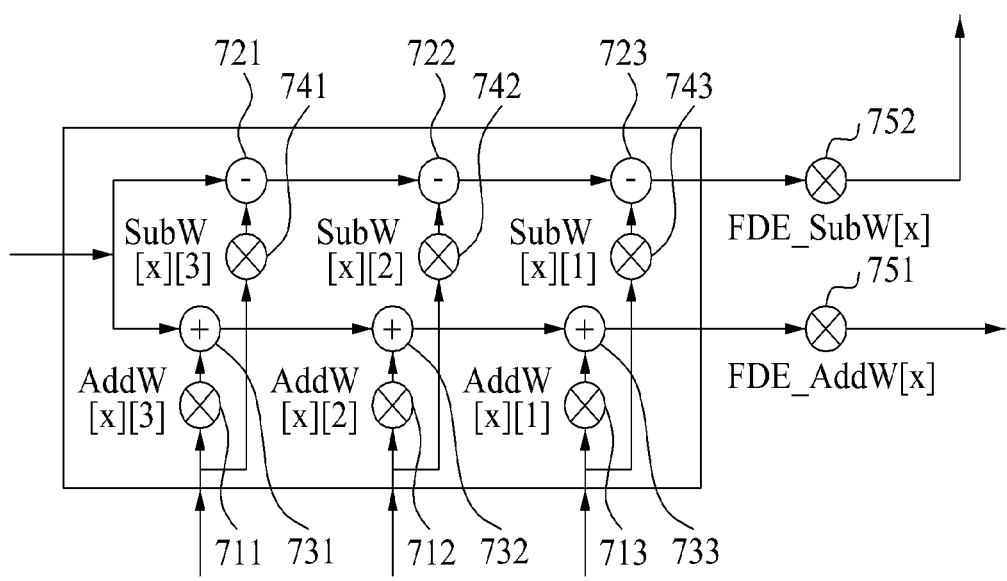
FIG. 7 illustrates an exemplary subtraction/addition unit and an exemplary frequency domain equalizer that may be incorporated into the QRDE-MLD multi-antenna signal receiving device of FIG. 5.

FIG. 7 illustrates an exemplary subtraction/addition unit and the frequency domain equalizer that may be incorporated into the QRDE-MLD multi-antenna signal receiving device of FIG. 5.

Referring to FIG. 7, the subtraction/addition unit includes a plurality of addition units 731, 732, and 733, a plurality of subtraction units 721, 722, and 723, and a plurality of multiplication units 711, 712, 713, 714, 741, 742, 743, 751, and 752.

The multiplication unit 711 performs an inner-product of an output of DFT 592 as illustrated in FIG. 5, with an addition coefficient AddW[X][3] and provides the result to the addition unit 731. The multiplication unit 712 performs an inner-product of the output of the DFT 592 with an addition coefficient AddW[X][2] and provides the result to the addition unit 732. The multiplication unit 713 performs an inner-product of the output of the DFT 592 with an addition coefficient AddW[X][1] and provides the result to the addition unit 733.

The multiplication unit 741 performs an inner-product of the output of the DFT 592 with an addition coefficient SubW[X][3] and provides the result to the subtraction unit 721. The multiplication unit 742 performs an inner-product of the output of the DFT 592 with an SubW[X][2] and provides the result to the subtraction unit 722. The multiplication unit 743 performs an inner-product of the output of the DFT 592 with an addition coefficient SubW[X][1] and provides the result to the subtraction unit 723.

The addition unit 731 adds $Q^H Y[X]$ and an output of the multiplication unit 711, the addition unit 732 adds an output of the addition unit 731 and an output of the multiplication unit 712, and the addition unit 733 adds an output of the multiplication unit 713 and an output of the addition unit 732.

The subtraction unit 721 subtracts an output of the multiplication unit 741 from the $Q^H Y[X]$, the subtraction unit 722 subtracts an output of the multiplication unit 742 from an output of the subtraction unit 721, and the subtraction unit 723 subtracts an output of the subtraction unit 743 from an output of the subtraction unit 722.

The subtraction unit 751 performs equalization of an output of the addition unit 733 by using an equalization coefficient FDE_AddW[X] in a frequency domain. Also, the multiplication unit 752 performs equalization of an output of the subtraction unit 723 by using an equalization coefficient FDE_SubW[X].

Figure 8:
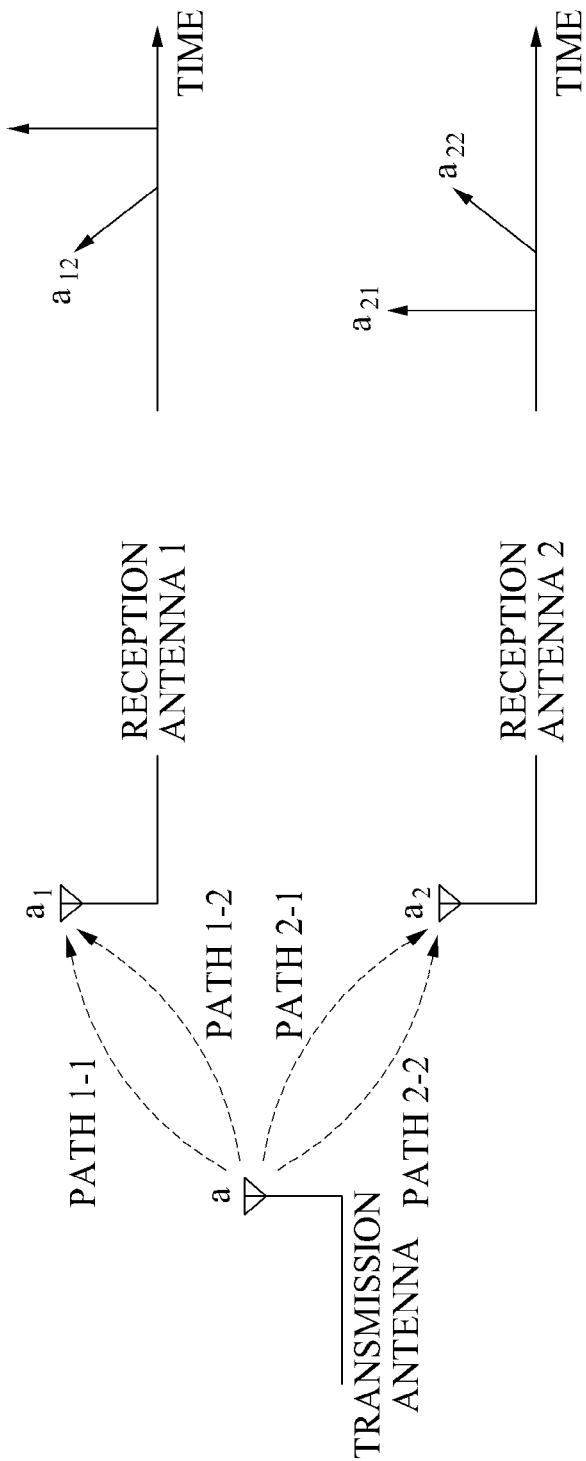
FIG. 8 is a diagram illustrating a multi-path interference (MPI).

FIG. 8 is a diagram illustrating a multi-path interference.

Referring to FIG. 8, a transmission symbol may be transmitted from a single transmission antenna to one or more reception antennas via a plurality of paths. For example, a received signal $a_1$ of a reception antenna 1 includes a component $a_{11}$ arriving via a path 1-1 and a component $a_{12}$ arriving via a path 1-2. A received signal $a_2$ of a reception antenna 2 includes a component $a_{21}$ arriving via a path 2-1 and a component $a_{22}$ arriving via a path 2-2. Exemplary graphs in which $a_{11}$ and $a_{12}$ constituting $a_1$, and $a_{21}$ and $a_{22}$ constituting $a_2$, are illustrated on the right-hand side of FIG. 8

Figure 9:
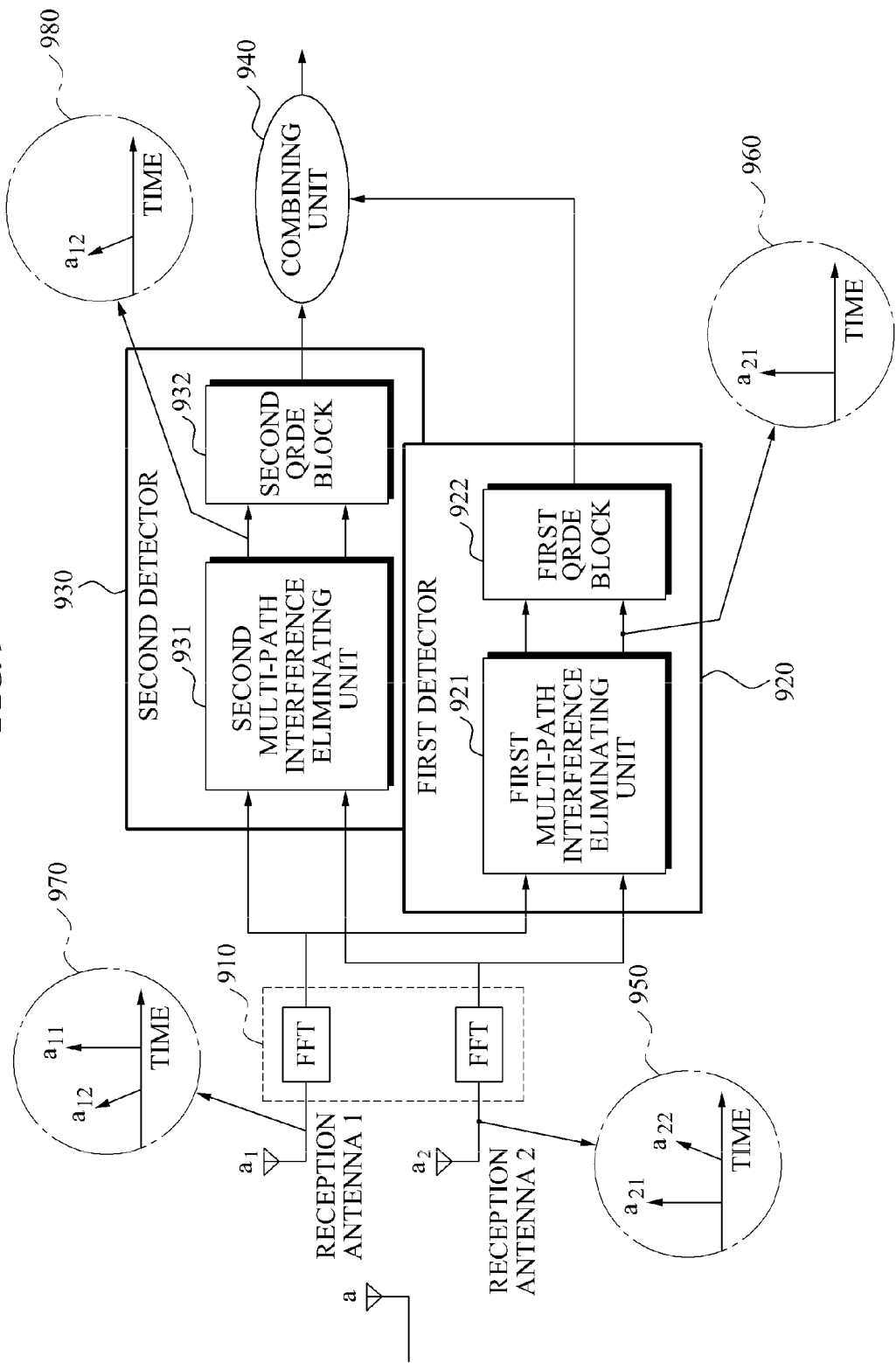
FIG. 9 is a diagram illustrating an example of a multi-path interference canceller (MPIC)-QRDE-MLD multi-antenna signal receiving device.

FIG. 9 is a block diagram illustrating an example of an MPIC-QRDE-MLD multi-antenna signal receiving device.

Referring to FIG. 9, the exemplary MPIC-QRDE-MLD multi-antenna signal receiving device may include two reception antennas, FFTs 910, a first detector 920, a second detector 930, and a combining unit 940. Although the MPIC-QRDE-MLD multi-antenna signal receiving device is capable of including more than or less than two reception antennas, for ease of description, a case of having two reception antennas will be described with reference to FIG. 9. Also, for ease of convenience, in this example a single transmission antenna transmits a symbol "a" included in a single stream.

As described in the description with reference to FIG. 8, it is assumed that a received signal of a reception antenna 1 is $a_1$ and a received signal of a reception antenna 2 is $a_2$. As illustrated in graphs 950 and 970, the received signal $a_1$ of the reception antenna 1 includes a component $a_{11}$ arriving via a path 1-1 and a component $a_{12}$ arriving via a path 1-2. The received signal $a_2$ of the reception antenna 2 includes a component $a_{21}$ arriving via a path 2-1 and a component $a_{22}$ arriving via a path 2-2.

The first detector 920 includes a first multi-path interference eliminating unit 921 and a first QRDE block 922. The second detector 930 includes a second multi-path interference eliminating unit 931 and a second QRDE block 932. In this example, the first QRDE block 922 and the second QRDE block 932 may perform the same operation as the QRDE blocks 390 and 590 described with reference to FIGS. 3 through 7, and thus detailed description thereof will be omitted.

The first detector 920 and the second detector 930 process received signals of reception antennas for each path. The first detector 920 processes the component $a_{11}$ corresponding to a path having a highest gain among components $a_{11}$ and $a_{12}$ of $a_1$ and also processes the component $a_{21}$ corresponding to a path having a highest gain among components $a_{21}$ and $a_{22}$ of $a_2$. The second detector 930 processes the component $a_{12}$ corresponding to a path having a lowest gain among components $a_{11}$ and $a_{12}$ of $a_1$ and also processes the component $a_{22}$ corresponding to a path having a lowest gain among components $a_{21}$ and $a_{22}$ of $a_2$.

For example, the first multi-path interference eliminating unit 921 removes a multi-path interference existing in the received signal $a_1$ of the reception antenna 1 and the received signal $a_2$ of the reception antenna 2, based on a stream or a transmission symbol detected from a prior iteration.

An output of the DFT 592 of FIG. 5, which is a stream detected from a prior iteration, is provided to the first multi-path interference eliminating unit 921 and the second multi-path interference eliminating unit 922. The first multi-path interference eliminating unit 921 and the second multi-path interference eliminating unit 922 removes a multi-path interference from the received signal $a_1$ of the reception antenna 1 and the received signal $a_2$ of the reception antenna 2, based on the output of the DFT 592, such as the stream detected from the prior iteration.

In this example, the first multi-path interference eliminating unit 921 outputs a component corresponding to a path having a highest gain from each of the received signal $a_1$ and the received signal $a_2$, and removes the remaining components. For example, the received signal $a_1$ of the reception antenna 1 includes the components $a_{11}$ and $a_{12}$, and the component $a_{11}$ corresponds to the path having the highest gain among $a_{11}$ and $a_{12}$. The first multi-path interference eliminating unit 921 removes the component $a_{12}$ from the received signal $a_1$ of the reception antenna 1 and outputs the component $a_{11}$. The first multi-path interference eliminating unit 921 removes the component $a_{22}$ from the components $a_{21}$ and $a_{22}$ included in the received signal $a_2$ of the reception antenna 2.

In this example, the second multi-path interference eliminating unit 922 outputs components corresponding to a path having a second highest gain. The second multi-path interference eliminating unit 922 removes the component $a_{11}$ from the received signal $a_1$ of the reception antenna 1 and outputs the component $a_{12}$. The second multi-path interference eliminating unit 922 removes the component $a_{21}$ from the components $a_{21}$ and $a_{22}$ included in the received signal $a_2$ of the reception antenna 2, and outputs the component $a_{22}$.

Outputs of the first multi-path interference eliminating unit 921 and the second multi-path interference eliminating unit 922 may be illustrated as shown in graphs 960 and 980. Referring to graph 960, an output of a lower end among outputs of the first multi-path interference eliminating unit 921 is the component $a_{21}$ corresponding to a path having a highest gain among the components $a_{21}$ and $a_{22}$. An output of an upper end among outputs of the second multi-path interference eliminating unit 922 is the component $a_{12}$ corresponding to a path having a lowest gain among the components $a_{11}$ and $a_{12}$. Although not illustrated in FIG. 9, the output of the upper end among the outputs of the first multi-path interference eliminating unit 921 may be $a_{11}$ that is corresponding to the path having highest gain among components $a_{11}$ and $a_{12}$ of $a_1$, and the output of the lower end among the outputs of the second multi-path interference eliminating unit 922 may be $a_{22}$ that is corresponding to the path having the lowest gain among components $a_{21}$ and $a_{22}$ of $a_2$.

A first QRDE block 922 performs detection with respect to the $a_{11}$ and $a_{12}$. In this example, the first QRDE block 922 performs functions of the QRDE blocks 390 and 590 as described with reference to FIGS. 3 through 7, and enables estimation of "a" based on $a_{11}$ and $a_{21}$. In the same manner, a second QRDE block 932 estimates "a" based on $a_{12}$ and $a_{22}$. Also, "a" estimated by the first QRDE block 922 and the second QRDE block 932 is provided to a combining unit 940, and the combining unit 940 combines "a" estimated by the first QRDE block 922 and the second QRDE block 932 to accurately estimate "a". In this example, an output of the combining unit 940 may be processed through an IDFT, an EDE, a LLR, a FEC, and the like (not illustrated).

Although not illustrated in FIG. 9, the QRDE block 922 of the first detector 920 may include a first Q matrix transformer that transforms $a_{11}$ and $a_{21}$ using a Q matrix, a plurality of first FDEs performing equalization of outputs of the first Q matrix transformers in a frequency domain prior to performing Inverse Fourier Transform, and a plurality of first IDFTs performing Inverse Discrete Fourier Transform with respect to outputs of the plurality of first FDEs. In the same manner, the QRDE block 922 of the second detector 930 may include a second Q matrix transformer that transforms $a_{12}$ and $a_{22}$ by using a Q matrix, a plurality of second FDEs performing equalization of outputs of the second Q matrix transformers in the frequency domain prior to performing Inverse Fourier Transform, and a plurality of second IDFTs performing Inverse Discrete Fourier Transform with respect to outputs of the plurality of second FDEs.

The MPIC-QRDE-MLD multi-signal receiving device removes the multi-path interference with a limited amount of calculations, and also processes a received signal of each reception antenna for each path, thereby obtaining a full diversity gain.

FIG. 10 is a diagram illustrating a received signal of each of four reception antennas, when four transmission antennas and the four reception antennas exist.

Referring to FIG. 10, it is assumed that the transmission antennas 1, 2, 3, and 4 respectively transmit a, b, c, and d streams or transmission symbols. Also, a received signal $r_1$ of the reception antenna 1 includes a component $a_1$ related to the a stream, a component $b_1$ related to the b stream, a component $c_1$ related to the c stream, and a component $d_1$ related to the d stream. In the same manner, a received signal $r_2$ of the reception antenna 2 includes a component $a_2$ related to the a stream, a component $b_2$ related to the b stream, a component $c_2$ related to the c stream, and a component $d_2$ related to the d stream. Also, a received signal $r_3$ of the reception antenna 3 includes a component $a_3$ related to the a stream, a component $b_3$ related to the b stream, a component $c_3$ related to the c stream, and a component $d_3$ related to the d stream. Also, a received signal $r_4$ of the reception antenna 4 includes a component $a_4$ related to the a stream, a component $b_4$ related to the b stream, a component $c_4$ related to the c stream, and a component $d_4$ related to the d stream.

In this example, $a_1, a_2, a_3, a_4, b_1, b_2, b_3, b_4, c_1, c_2, c_3, c_4, d_1, d_2, d_3$, and $d_4$ also include components corresponding to a plurality of paths due to the multiple paths. For the ease of description, it is assumed that components included in $a_1$ are represented as $a_{11}, a_{12}, \ldots, a_{1N}$ and components included in $b_1$ are represented as $b_{11}, b_{12}, \ldots, b_{1N}$, in an order of a highest gain of a corresponding path. Although not illustrated in FIG. 10, the components included in $a_2$ are also represented as $a_{21}, a_{22}, \ldots, a_{2n}$ in an order of a highest gain of a corresponding path, and the components of a3, $a_4, b_1, b_2, b_3, b_4, c_1, c_2, c_3, c_4, d_1, d_2, d_3$, and $d_4$ are also represented in the same manner.

Figure 11:
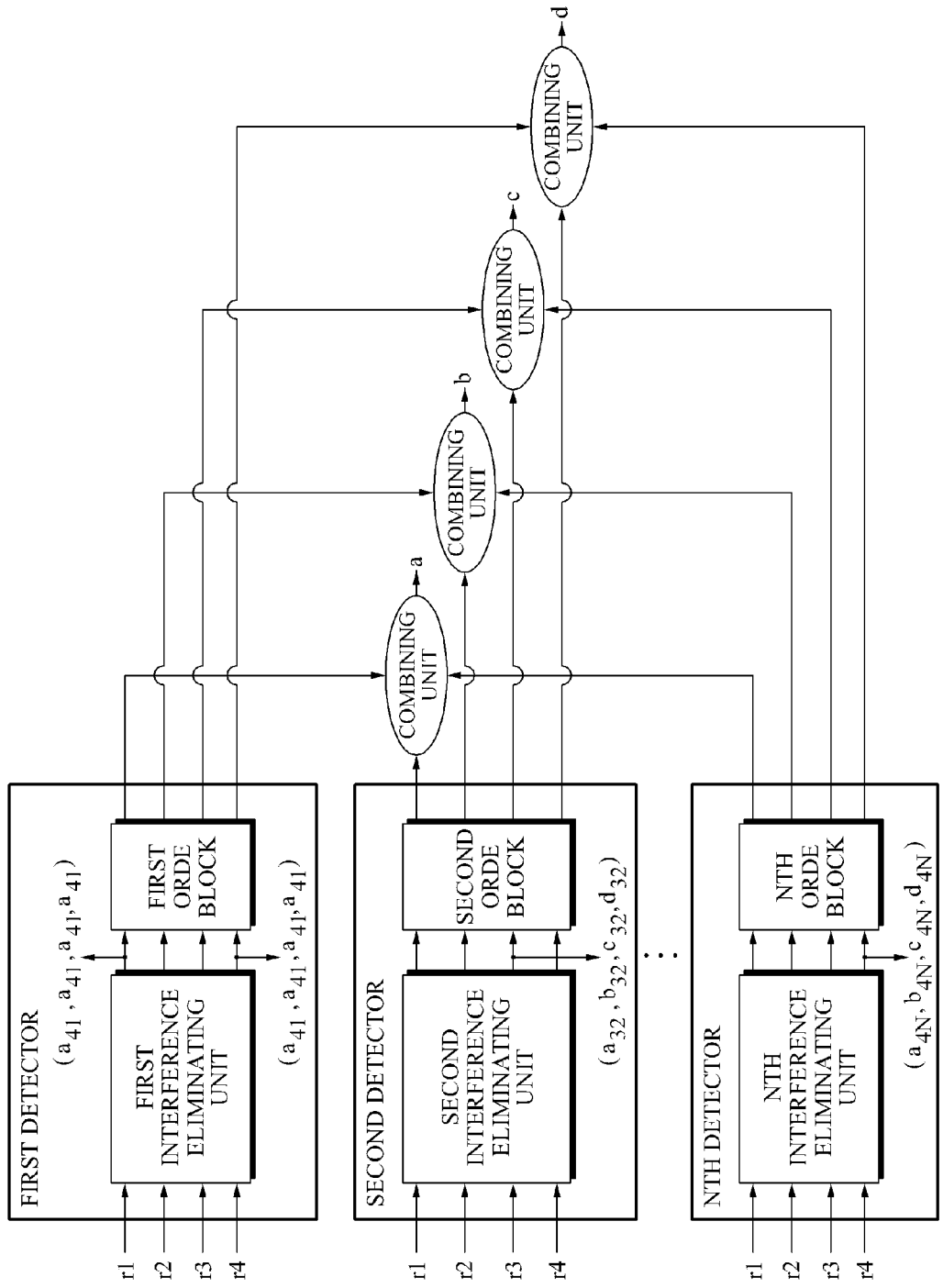
FIG. 11 illustrates detectors and combining units of an MPIC-QRDE-MLD multi-antenna signal receiving device for processing the received signal of each of the four reception antennas of FIG. 10.

FIG. 11 illustrates detectors and combining units of an MPIC-QRDE-MLD multi-antenna signal receiving device for processing the received signal of each of the four reception antennas of FIG. 10.

Referring to FIG. 11, the MPIC-QRDE-MLD multi-antenna signal receiving device may include a plurality of detectors. In some embodiments the detectors comprise the same structure.

A first detector may process a component corresponding to a path having a highest gain among components included in $a_1, a_2, a_3, a_4, b_1, b_2, b_3, b_4, c_1, c_2, c_3, c_4, d_1, d_2, d_3$, and $d_4$. Hereinafter, the multi-path interference eliminating unit is referred to as interference eliminating unit. As an example, a first interference eliminating unit may extract and output $(a_{11}, b_{11}, c_{11}, d_{11}), (a_{21}, b_{21}, c_{21}, d_{21}), (a_{31}, b_{31}, c_{31}, d_{31}), (a_{41}, b_{41}, c_{41}, d_{41})$ from $r_1, r_2, r_3$, and $r_4$. A second detector may process a component corresponding to a path having a second highest gain among the components included in $a_1, a_2, a_3, a_4, b_1, b_2, b_3, b_4, c_1, c_2, c_3, c_4, d_1, d_2, d_3$, and $d_4$. Accordingly, a second interference eliminating unit of the second detector may extract and output $(a_{12}, b_{12}, c_{12}, d_{12}), (a_{22}, b_{22}, c_{22}, d_{22}), (a_{32}, b_{32}, c_{32}, d_{32}), (a_{42}, b_{42}, c_{42}, d_{42})$ from $r_1, r_2, r_3$, and $r_4$. In the same manner, a second interference eliminating unit of an $n^{th}$ detector may extract and output $(a_{1N}, b_{1N}, c_{1N}, d_{1N}), (a_{2N}, b_{2N}, c_{2N}, d_{2N}), (a_{3N}, b_{3N}, c_{3N}, c_{3N}), (a_{4N}, b_{4N}, c_{4N}, d_{4N})$ from $r_1, r_2, r_3$, and $r_4$.

QRDE blocks estimate streams "a", "b", "c", and "d" based on outputs of the interference eliminating units. In this example, the QRDE blocks perform QR decomposition detection and frequency domain equalization based on the outputs of interference eliminating units as described with reference FIGS. 3 through 7.

The outputs of the QRDE blocks are provided to the combining units. A first output of a first QRDE block, a first output of a second QRDE block, and a first output of an $N^{th}$ QRDE block, which are related to "a", are provided to a combining unit of an uppermost stage, and the combining unit of the uppermost stage combines the first outputs of the QRDE blocks to gain a full diversity gain and to estimate "a". An output of the combining unit of the uppermost stage may be processed through IDFT, EDE, LLR, FEC, and the like which are not illustrated in FIG. 11. In the same manner, a combining unit of a second stage combines second outputs of the QRDE blocks to estimate "b", a combining unit of a third stage combines third outputs of the QRDE blocks to estimate "c", and a combining unit of a fourth stage combines fourth outputs of the QRDE blocks to estimate "d".

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and the methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multi-antenna signal receiving device, comprising:
   at least two antennas configured to receive at least one stream, a received signal of a first antenna including components corresponding to a plurality of first paths and a received signal of a second antenna including components corresponding to a plurality of second paths;
   a first detector configured to detect a component corresponding to a first path of the plurality of first paths from among components included in the received signal of the first antenna, to detect a component corresponding to a second path of the plurality of second paths from among components included in the received signal of the second antenna, to remove a multi-path interference in the received signal using at least one stream detected from a prior iteration, and to extract the component corresponding to the first path from among the components in the received signal of the first antenna;
   a second detector configured to detect a component corresponding to the remaining first paths of the plurality of first paths from among the components included in the received signal of the first antenna, and to detect a component corresponding to the remaining second paths of the plurality of second paths from among the components included in the received signal of the second antenna; and
   a combining device configured to combine the detected components from the first detector and the detected components from the second detector, to detect the at least one stream.

2. The device of claim 1, further comprising: a QR decomposition device configured to perform QR decomposition with respect to a channel matrix based on the received at least one stream, to calculate a Q matrix and an R matrix.

3. The device of claim 2, wherein the first detector detects the at least one stream using the Q matrix and the R matrix.

4. The device of claim 3, wherein the first path has a higher gain than the remaining first paths of the plurality of first paths.

5. The device of claim 3, wherein the first detector further removes a multi-path interference existing in the received signal of the second antenna using at least one stream detected from a prior iteration, extracts the component corresponding to the second path from among the components included in the received signal of the second antenna, and detects the at least one stream using the Q matrix and the R matrix.

6. The device of claim 2, wherein the first detector comprises a first multi-path interference eliminating device configured to remove the multi-path interference existing in the received signal of the first antenna using the at least one stream detected from the prior iteration, and to extract the component corresponding to the first path from among the components included in the received signal of the first antenna.

7. The device of claim 6, wherein the first detector further comprises a first Q matrix transformer configured to transform the component corresponding to the first path of the plurality of first paths using the Q matrix.

8. The device of claim 7, wherein the first detector further comprises a plurality of first frequency domain equalizers (FDEs) configured to perform equalization of an output of the first Q matrix transformer in a frequency domain prior to performing Inverse Fourier Transform.

9. The device of claim 8, wherein the first detector further comprises a plurality of first Inverse Discrete Fourier Transformers (IDFTs) configured to perform Inverse Discrete Fourier Transform with respect to outputs of the plurality of first FDEs.

10. The device of claim 6, wherein the first multi-path interference eliminating device further removes a multi-path interference existing in the received signal of the second antenna using at least one stream detected from a prior iteration, and extracts the component corresponding to the second path from among the components included in the received signal of the second antenna.

11. The device of claim 2, wherein the second detector comprises a second multi-path interference eliminating device configured to remove the multi-path interference existing in the received signal of the first antenna using the at least one stream detected from the prior iteration, and to extract the component corresponding to the remaining first paths from among the components included in the received signal of the first antenna.

12. The device of claim 11, wherein the second multi-path interference eliminating device further removes a multi-path interference existing in the received signal of the second antenna using at least one stream detected from a prior iteration, and extracts the component corresponding to the remaining second paths from among the components included in the received signal of the second antenna.

13. The device of claim 11, wherein the second detector further comprises a second Q matrix transformer configured to transform the component corresponding to the remaining first paths and the component corresponding to the remaining second paths using the Q matrix.

14. The device of claim 13, wherein the second detector further comprises a plurality of second FDEs configured to perform equalization of an output of the second Q matrix transformer in a frequency domain prior to performing Discrete Inverse Fourier Transform.

15. The device of claim 14, wherein the second detector further comprises a plurality of second IDFTs configured to perform Inverse Discrete Fourier Transform with respect to outputs of the plurality of second FDEs.

\* \* \* \* \*